May 22, 1923.
J. BAUER
STORM SHIELD
Filed Nov. 3, 1920
1,455,830
2 Sheets-Sheet 1
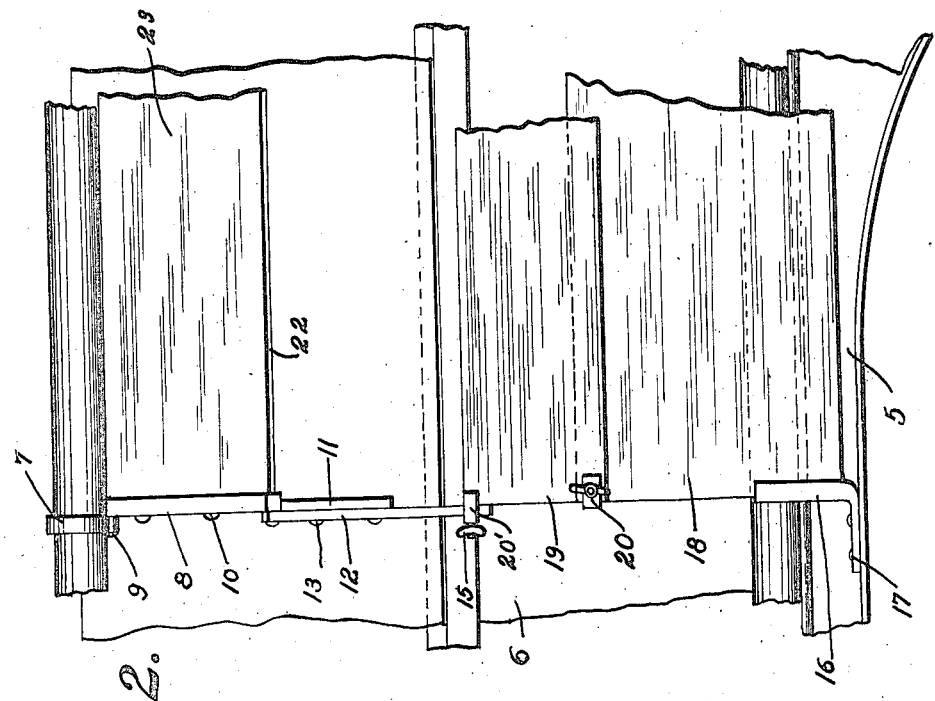
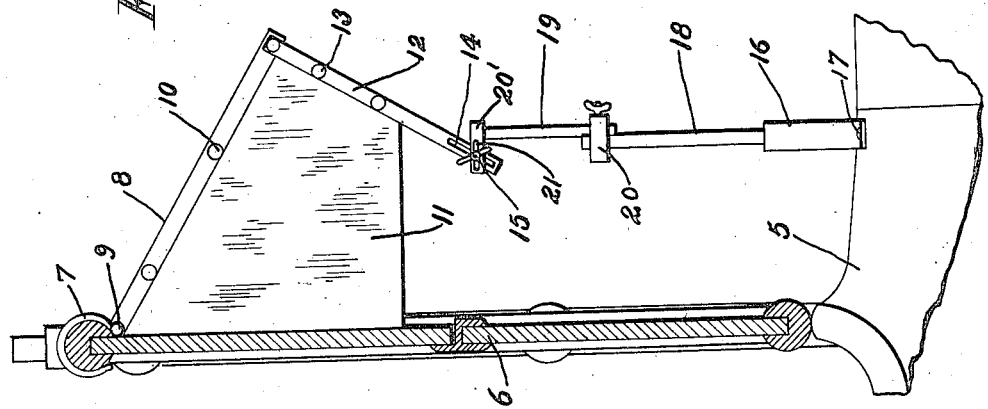
Inventor
John Bauer.
By C.A.Snow&Co.
Attorney May 22, 1923.
J. BAUER
STORM SHIELD
Filed Nov. 3, 1920
1,455,830
2 Sheets-Sheet 2
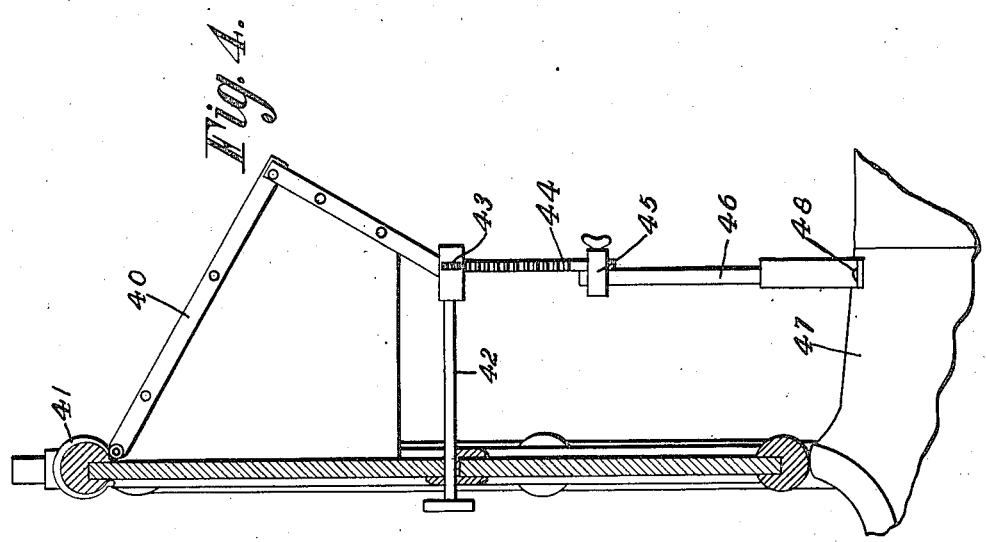
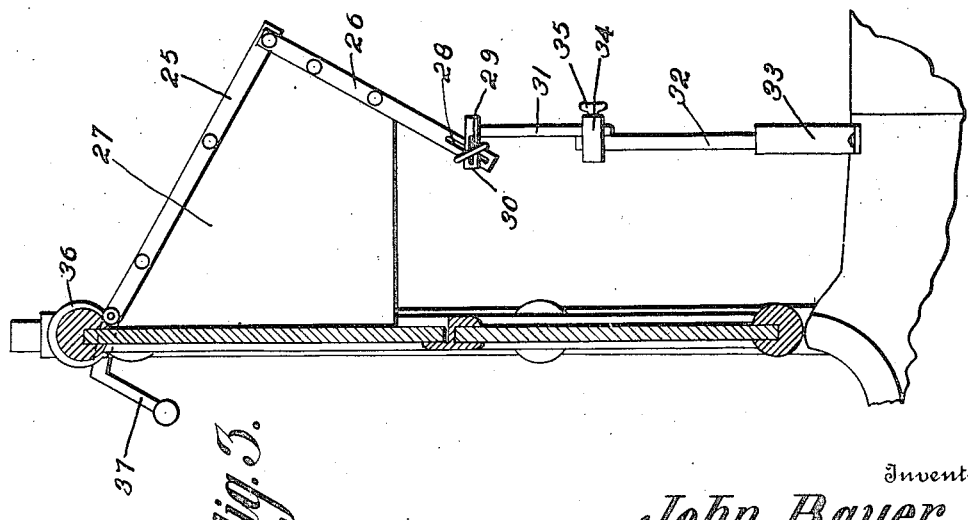
Inventor
John Bauer.
By C. A. Snow & Co.
Attorneys Patented May 22, 1923.

1,455,830

UNITED STATES PATENT OFFICE.

JOHN BAUER, OF DETROIT, MICHIGAN.

STORM SHIELD.

Application filed November 3, 1920. Serial No. 421,516.

*To all whom it may concern:*

Be it known that I, JOHN BAUER, a citizen of the United States, residing at Detroit, in the county of Wayne and State of Michigan, have invented a new and useful Storm Shield (Case B), of which the following is a specification.

This invention relates to wind shield attachments and more particularly to an attachment to be positioned on the wind shield at a point directly in front of the operator, to protect the wind shield from moisture, to the end that the operator has a clear line of vision through the wind shield, at all times.

An object of the invention is to provide a device of this character which may be readily and easily positioned, over the wind shield frame, by persons unfamiliar with mechanics.

A further object of the invention is to provide for the adjustment of the device so that the sight opening thereof may be adjusted to various sizes at the will of the operator.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:—

Figure 1 illustrates a side elevational view of a wind shield supplied with an attachment constructed in accordance with the present invention;

Figure 2 illustrates a fragmental front elevational view of the same:

Figure 3 illustrates a vertical sectional view through a wind shield showing a modified form of the invention as applied thereto; and Figure 4 illustrates a vertical sectional view through a wind shield showing a further modified form of the invention.

Referring to the drawings in detail, the reference character 5 designates the usual automobile cowl, which supports the usual wind shield 6 to which the attachment is applied.

The attachment includes a pair of spring clamping members indicated at 7, there being however only one of these clamping members shown in the present drawing, and since the side members of the attachment are identical, only one of such side members will be described.

This hook member has pivotal connection with the upper hinged supporting arm 8 as at 9, the arm 8 however being provided with suitable securing means indicated at 10 for securing the rigid side members 11 of the attachment to the arm 8. Pivotally connected to the lower extremity of the supporting arm 8, is an inwardly inclined arm 12, which also is provided with securing members indicated at 13, for securing the lower front edge of the side member 11 thereto, the lower extremity of the arm 12, however being provided with an elongated opening 14 adapted to receive the adjusting bolt 15.

The lower portion of the attachment includes a bracket member indicated at 16 which is secured to the cowl as at 17 and is provided with a groove adapted to accommodate the lower rigid member 18, which may be formed of glass or other rigid transparent material, the upper portion of the member 18 being held into engagement with the relatively short rigid member 19, as by means of the adjustable clamping member 20.

Extending outwardly from the upper edge of the member 19 is an arm 20' which is secured to the member 19 in any suitable manner, and is provided with an elongated opening 21, the elongated opening 21 adapted to cross the opening 14 formed in the arm 12, so that the bolt 15 which passes through the opening 14, may also pass through the opening 21 to permit of an adjustment of the member 19, with relation to the upper portion of the attachment, thereby providing for the adjustment between the lower front edge 22 of the inclined body portion 23 of the attachment, and the upper edge of the member 19 to insure an unobstructed line of vision through the wind shield.

In the modified form of the invention, as illustrated by Figure 3 of the drawings, the upper portion of the protector includes a pair of side arms 25 which have connected thereto the depending arms 26, which arms support the end guards 27, the arms 26 being shown as provided with elongated openings 28 formed adjacent their free ends.

A thumb screw 29 operates through the opening 28 and through a similar opening provided in the arm 30 which has connection with the vertical rod 31, so that the rod 31 may be adjusted with respect to the arms 26 to adjust the attachment to various angles.

The rod 31 is supported by the rod 32 which has connection with the cowl of a motor vehicle, as by means of the bracket 33. The connection between the rods 31 and 32 is made through the collar which embraces portions of each rod, and secured against movement thereon, as by means of the thumb screw 35.

Hook members 36 support the arms 25, the hook members 36 being positioned over the upper edge of a wind shield, there being provided an operating arm 37 which has connection with the arms 25 so that movement of the arms 37 will produce a relative movement of the arms 25 to adjust the attachment to the proper angle to insure a clear line of vision for the operator of the machine.

As shown by Figure 4 of the drawings, the upper section of the protector is similar to that shown by Figure 3 of the drawings, the same including a pair of spaced bars 40 pivotally connected to the hook member 41 by means of which the arms are positioned over a wind shield.

In this form of the invention the guard is adjusted by means of the view space regulating shaft 42 which extends through the wind shield proper and carries a pinion 43 on the outer extremity thereof, which pinion is designed to mesh with the rack bar 44 that has its lower extremity positioned within the collar 45 that embraces the vertical rod 46, which in turn is bolted to the cowl 47 as at 48.

In the operation of this structure, it is obvious that by rotating the shaft 42, the lower section 44 may be moved with respect to the upper section.

Having thus described the invention, what is claimed as new is:—

In combination with a wind shield and cowl of a motor vehicle, a wind shield protector including an upper section and a lower section, said upper section comprising side bars including pivotally connected sections, bracket members secured to the cowl, said bracket members having grooves, guarding members positioned in the grooves to permit of movement of the guarding members with respect to the bracket members, and means for connecting the upper and lower sections to permit of adjustment of the lower section with respect to the upper section, and guarding members carried by the upper section.

In testimony that I claim the foregoing as my own, I have hereto affixed my signature in the presence of two witnesses.

JOHN BAUER.

Witnesses:
   E. A. PUTHUFF,
   CORINNE JONES.